(12) United States Patent
Epstein et al.

(10) Patent No.: US 6,209,029 B1
(45) Date of Patent: *Mar. 27, 2001

(54) METHOD AND APPARATUS FOR ACCESSING DATA SOURCES IN A THREE TIER ENVIRONMENT

(75) Inventors: Arny Epstein, Lexington; Larry W. Allen, Sudbury; John Chiu, Lexington, all of MA (US)

(73) Assignee: Silverstream Software, Inc., Billerica, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/076,924

(22) Filed: May 12, 1998

(51) Int. Cl.[7] .................................................. G06F 13/00
(52) U.S. Cl. ........................ 709/219; 709/223; 709/315; 709/329
(58) Field of Search ................................. 709/203, 204, 709/205, 202, 221, 217, 219, 223, 224, 225, 313, 315, 319, 328, 329

(56) References Cited

U.S. PATENT DOCUMENTS

| | | | |
|---|---|---|---|
| 5,701,451 | * 12/1997 | Rogers et al. ............................ | 707/1 |
| 5,761,662 | * 6/1998 | Dasan ...................................... | 707/10 |
| 5,848,424 | * 12/1998 | Scheunkman ........................... | 707/501 |
| 5,907,547 | * 5/1999 | Foladate et al. ........................ | 370/352 |
| 5,928,324 | * 7/1999 | Sloan ....................................... | 709/203 |
| 5,943,496 | * 8/1999 | Li et al. .................................. | 395/709 |
| 5,951,636 | * 9/1999 | Zerber .................................... | 709/202 |
| 5,964,836 | * 10/1999 | Rowe et al. ............................. | 709/221 |
| 6,003,094 | * 12/1999 | Dean ....................................... | 709/303 |
| 6,049,664 | * 4/2000 | Dale et al. .............................. | 395/701 |

* cited by examiner

Primary Examiner—Viet D. Vu
(74) Attorney, Agent, or Firm—The Hecker Law Group

(57) ABSTRACT

The present invention provides a three tier environment with improved data access capabilities. A browser can obtain data from a data source by interacting with that data source through an application server. The application server consists of a web server portion and a data server portion. Instead of CGI scripts interacting with a data source through a CGI interface, the present invention uses applets and objects to interact directly with a data source. A web page requested by a browser includes a "presentation" which is applet code that accesses data from a data source. When the application server receives a request for a page that is to contain data from a data source, the application server identifies a page that includes a reference to a presentation. The non-data portion of the page emits itself to the browser while at the same time the presentation undertakes the data retrieval. The browser receives the page, which contains an applet tag. The applet class is sent to the browser. The applet requests a URL that represents the data that is being retrieved for the page. The data is downloaded to the applet from the application server and displayed in the previously forwarded page. The presentation in the page working in conjunction with the data source takes the place of CGI scripting.

20 Claims, 7 Drawing Sheets

METHOD AND APPARATUS FOR ACCESSING DATA SOURCES IN A THREE TIER ENVIRONMENT

BACKGROUND OF THE INVENTION

1. Field of the Invention

This invention relates to the field of data source access in a three tier environment.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

The Internet, or World Wide Web, is used extensively to access information from a variety of sources. Usually, the internet is accessed on a computer by using a software application known as a "browser". Sometimes it is desired to access information from a database and use that information in an application used with the browser. A disadvantage of the current technology is that it requires advance knowledge of the database and the application so that they may communicate with each other. This problem can be better understood by a review of the structure and operation of the internet.

The Internet

The Internet is a worldwide matrix of interconnected computers. An Internet client accesses a computer on the network via an Internet provider. An Internet provider is an organization that provides a client (e.g., an individual or other organization) with access to the Internet (via analog telephone line or Integrated Services Digital Network line, for example). A client can, for example, read information from, download a file from or send an electronic mail message to another computer/client using the Internet.

To retrieve a file on the Internet, a client must search for the file, make a connection to the computer on which the file is stored, and download the file. Each of these steps may involve a separate application and access to multiple, dissimilar computer systems. The World Wide Web (WWW) was developed to provide a simpler, more uniform means for accessing information on the Internet.

The components of the WWW include browser software, network links, and servers. The browser software, or browser, is a user-friendly interface (i.e., front-end) that simplifies access to the Internet. A browser allows a client to communicate a request without having to learn a complicated command syntax, for example. A browser typically provides a graphical user interface (GUI) for displaying information and receiving input. Examples of browsers currently available include Mosaic, Netscape Navigator and Communicator, Microsoft Internet Explorer, and Cello.

Information servers maintain the information on the WWW and are capable of processing a client request. Hypertext Transport Protocol (HTTP) is the standard protocol for communication with an information server on the WWW. HTTP has communication methods that allow clients to request data form a server and send information to the server.

To submit a request, the client contacts the HTTP server and transmits the request to the HTTP server. The request contains the communication method requested for the transaction (e.g., GET an object from the server or POST data to an object on the server). The HTTP server responds to the client by sending a status of the request and the requested information. The connection is then terminated between the client and the HTTP server.

A client request therefore, consists of establishing a connection between the client and the HTTP server, performing the request, and terminating the connection. The HTTP server does not retain any information about the request after the connection has been terminated. HTTP is, therefore, a stateless protocol. That is, a client can make several requests of an HTTP server, but each individual request is treated independent of any other request. The server has no recollection of any previous request.

An addressing scheme is employed to identify Internet resources (e.g., HTTP server, file or program). This addressing scheme is called Uniform Resource Locator (URL). A URL contains the protocol to use when accessing the server (e.g., HTTP), the Internet domain name of the site on which the server is running, the port number of the server, and the location of the resource in the file structure of the server.

The WWW uses a concept known as hypertext. Hypertext provides the ability to create links within a document to move directly to other information. To activate the link, it is only necessary to click on the hypertext link (e.g., a word or phrase). The hypertext link can be to information stored on a different site than the one that supplied the current information. A URL is associated with the link to identify the location of the additional information. When the link is activated, the client's browser uses the link to access the data at the site specified in the URL.

If the client request is for a file, the HTTP server locates the file and sends it to the client. An HTTP server also has the ability to delegate work to gateway programs. The Common Gateway Interface (CGI) specification defines a mechanism by which HTTP servers communicate with gateway programs. A gateway program is referenced using a URL. The HTTP server activates the program specified in the URL and uses CGI mechanisms to pass program data sent by the client to the gateway program. Data is passed from the server to the gateway program via command-line arguments, standard input, or environment variables. The gateway program processes the data and returns its response to the server using CGI (via standard input, for example). The server forwards the data to the client using the HTTP.

A browser displays information to a client/user as pages or documents (referred to as "web pages" or "web sites"). A language is used to define the format for a page to be displayed in the WWW. The language is called Hypertext Markup Language (HTML). A WWW page is transmitted to a client as an HTML document. The browser executing at the client parses the document and produces a displays a page based on the information in the HTML document.

HTML is a structural language that is comprised of HTML elements that are nested within each other. An HTML document is a text file in which certain strings of characters, called tags, mark regions of the document and assign special meaning to them. These regions are called HTML elements. Each element has a name, or tag. An element can have attributes that specify properties of the element. Blocks or components include unordered list, text boxes, check boxes, radio buttons, for example. Each block has properties such as name, type, and value. The following provides an example of the structure of an HTML document:

<HTML>
     <HEAD>
      . . . element(s) valid in the document head
     </HEAD>
     <BODY>
      . . . element(s) valid in the document body

</BODY>
</HTML>

Each HTML element is delimited by the pair of characters "<" and ">". The name of the HTML element is contained within the delimiting characters. The combination of the name and delimiting characters is referred to as a marker, or tag. Each element is identified by its marker. In most cases, each element has a start and ending marker. The ending marker is identified by the inclusion of an another character, "/" that follows the "<" character.

HTML is a hierarchical language. With the exception of the HTML element, all other elements are contained within another element. The HTML element encompasses the entire document. It identifies the enclosed text as an HTML document. The HEAD element is contained within the HTML element and includes information about the HTML document. The BODY element is contained within the HTML. The BODY element contains all of the text and other information to be displayed. Other HTML elements are described in HTML reference manuals.

Communicating with Databases

One typical use of computer systems is to retrieve data from a database. FIG. 2 illustrates an early prior art architecture for accomplishing this task known as "client-server" architecture. In this architecture, the client 201 is a computer system with processing capability, and running an application that can process data. However, the client does not store the data that it uses. That data is stored in a central location such as mass storage 204 and is provided to the client 201 by a database server 202. The client 201 communicates to the server 202 over a communication link 203. The client prepares a request for data that is called a database query and sends the query over link 203 to the server 202. The server 202 processes the query, collects the requested data from mass storage 204, and returns the data to the client 201 over the communications link 203.

One disadvantage of the client server architecture is the requirement of a direct communications link to the database server. Another disadvantage is the fact that the requesting application on the client machine is written specifically to interact with the database on the server machine. If the database system changes, or if it is desired to have the client access another database, new program code must be written to handle the change.

Database Access Through Internet

With the increased use of the internet, it was desired to provide access to databases from internet clients. An internet client uses a browser to access the internet via a web server. An example of an architecture for accessing a database through the internet is illustrated in FIG. 3. A client running a browser 301 communicates through the internet 307 to a web server 302. The web server 302 receives requests from the browser and returns information to the browser through the internet. When a browser makes a database request, the web server forwards the request to a process 303 that can communicate with a database. To provide the ability to talk to more than one database, such as databases 305 and 306 of FIG. 3, an interface protocol known as Common Gateway Interface (CGI) 304 was created and used to interface between process 303 and databases 305 and 306.

In operation, the web server 302 receives a request for data. The web server 302 creates a database query that is sent to process 303. Process 303 communicates with the appropriate database through CGI 304 and returns the results to web server 302. Web server generates an HTML page using the returned data and sends the page to the browser 301 through the internet 307. This approach is referred to as a "three tier" architecture. The tiers consist of the client, the interface (web browser) and the database.

There are a number of disadvantages of this prior art three tier architecture. One disadvantage is that a CGI script is required for each database. Writing the CGI scripts is complex and requires knowledge of the internet, the web server, and the database being accessed. Each application is developed independently with little possibility for sharing of resources. Another disadvantage is the lack of interactivity. There is no computation being accomplished on the browser side. For example, in some cases a user may need to complete and submit a request form to retrieve information from a database. If the user enters incorrect information, the form must be submitted through the internet to the web server, processed, and then returned to the user before the user knows that its request is not correct.

Another disadvantage is if the database changes, the CGI process needs to be recoded. This makes it hard to maintain up to date CGI processes. This could be required even with different versions of the original database. In addition, access to the database, that is, permissions to use the database, are handled at the web server. Therefore coding of some permission scheme is required.

Another disadvantage of the prior art CGI approach is that often a business must maintain two sets of applications, one for in house and one for customers. For example, a business will access its own database through a local area network that does not require the use of CGI scripts or processes. But customer access is limited to the web server topology, requiring CGI scripts. Administration of systems in the CGI topology is currently manual, with now automatic control systems. Another disadvantage is the lack of source code control in the prior art.

One prior art approach to provide improved access to a database from a browser is to use browser independent applets. An embodiment of this prior art scheme is illustrated in FIG. 4. FIG. 4 is similar to FIG. 3, with the addition of a Java™ Virtual Machine 401 executing on the Browser computer. The virtual machine 401 receives applets (object code) stored on the server when needed for execution on the browser via the virtual machine. One example of an applet is applet 402 of FIG. 4.

In the example of FIG. 4, the applet is an executable application that performs database accesses directly to the database. The applet may be a form, for example, that a user completes in order to make a database request. The applet may have test to determine if the form is completed properly prior to the form being submitted to the database. This provides more efficient operation than the prior art scheme of sending the form data to the web server for validation.

A problem with the topology of FIG. 4 is that the web servers of the prior art were not aware of the Java™ programming language. As a result, the applet communicated directly to the database. This produced a client-server topology for database accesses, with all of the attendant disadvantages described above.

SUMMARY OF THE INVENTION

The present invention provides a three tier environment with improved data access capabilities. A browser can obtain data from a data source by interacting with that data source through an application server. The application server consists of a web server portion and a data server portion. Instead of CGI scripts interacting with a data source through a CGI interface, the present invention uses applets and objects to interact directly with a data source. A web page requested by a browser includes a "presentation" which is applet code that accesses data from a data source. When the application server receives a request for a page that is to contain data from a data source, the application server identifies a page that includes a reference to a presentation. The non-data portion of the page emits itself to the browser while at the same time the presentation undertakes the data retrieval. The browser receives the page, which contains an applet tag. The applet class is sent to the browser. The applet requests a URL that represents the data that is being retrieved for the page. The data is downloaded to the applet from the application server and displayed in the previously forwarded page. The presentation in the page working in conjunction with the data source takes the place of CGI scripting.

DETAILED DESCRIPTION OF THE INVENTION

The invention is a method and apparatus for accessing data sources in a three tier environment. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

The invention provides a system for building methods for retrieving data into HTML pages that are to display or retrieve data from a data source. The invention builds a "presentation" into an HTML page, consisting of applet code, that initiates the access to a database for data retrieval or update. The data to be returned is assigned a temporary URL that is sent to a browser with a page that will contain the data. The display page includes an applet that will ask for the temporary URL and display the data in the page when it is retrieved. The processing of these pages containing presentations is performed by a tier referred to as an "application server".

Application Server

Figure 5:
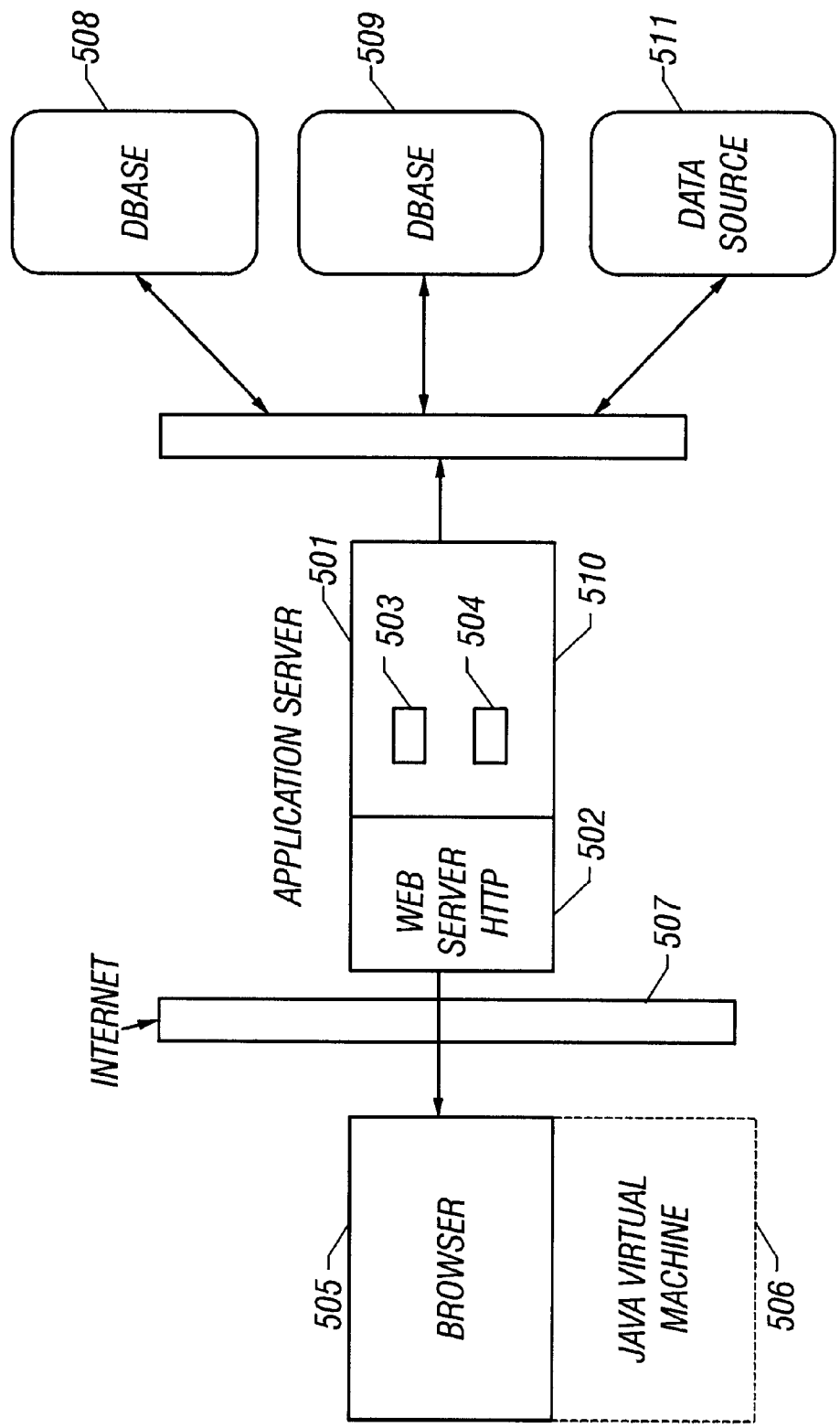
FIG. 5 is a block diagram of an embodiment of the present invention.

The present invention uses an application server in place of the web server. A block diagram of the invention is illustrated in FIG. 5. A browser 505 with a virtual machine 506 communicates through the internet 507 to the application server 501. The application server 501 communicates to databases 508 and 509, and to any data source such as data source 511

In the present invention the application server includes two parts. One part is the web server 502. This part functions as a prior art web server, providing communication over the internet via HTTP. The second portion is a data server 510 that communicates with databases and other data sources, replacing the CGI communication of the prior art. The data sources may include live feeds, collaboration files such as Lotus Notes, object databases, or any other data source. The data server portion 510 includes code such as code 503 and/or 504 that receives a database request and determines an appropriate response.

Figure 6:
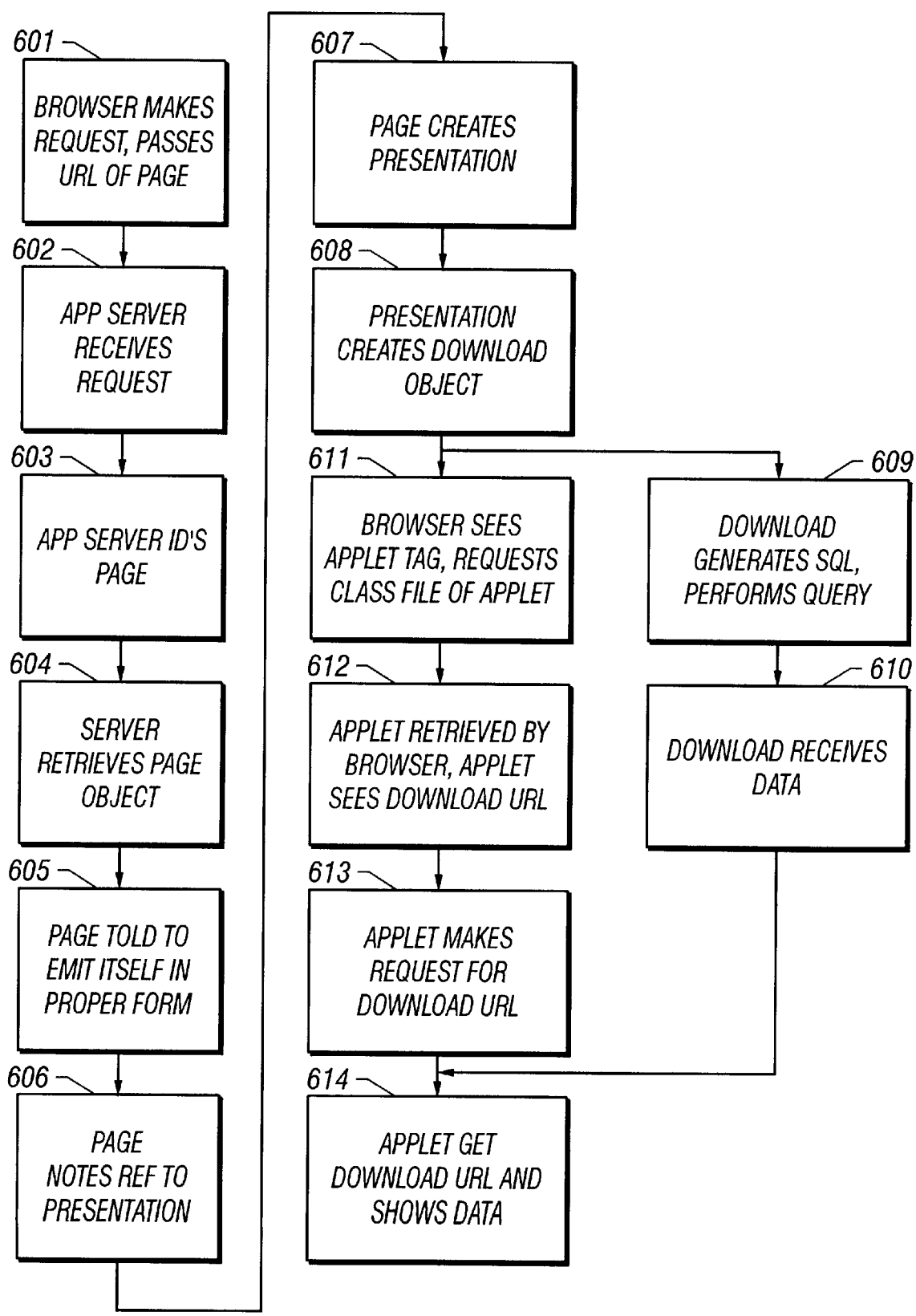
FIG. 6 is a flow diagram of the operation of the present invention.

A flow diagram of the operation of the present invention is illustrated in FIG. 6. At step 601, the browser does a request for data and passes a URL for an HTML page. The application server 501 receives the request from the browser at step 602 and examines the URL. The URL is identified as the URL of an active page in the server at step 603.

At step 604 the web server retrieves the page object that corresponds to the URL sent by the browser. A distinguishing feature of the application server of the present invention is that every object that the server can return has a type associated with it. Type information enables the server to know that when a page of this type is retrieved, additional processing is required before the page is returned to the browser. This processing entails preparing the applet that is going to run in the page. That is encapsulated in the processing of the page.

At step 605 the page object is told to emit itself, to return HTML to the browser. In the process of emitting itself, the page object detects that it has a reference to a presentation at step 606. The "presentation" is Java™ code that accesses data (or any other browser independent executable code).

Figure 7:
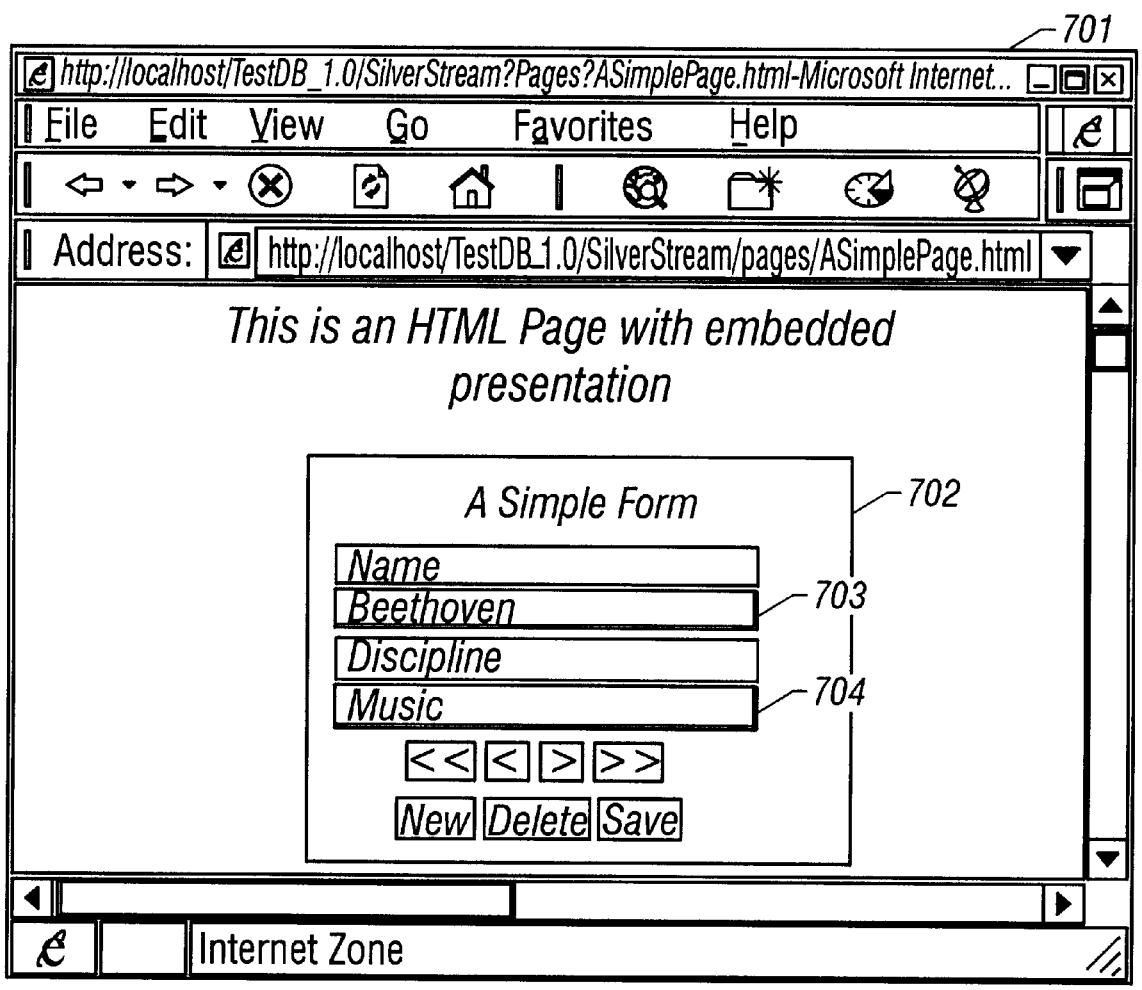
FIG. 7 is a screen shot illustrating a web page with a presentation.

Referring briefly to FIG. 7, a web page 701 is illustrated with a built in presentation 702. The presentation 702 is a form for data entry that refers to database information. There is a "Name" field 703 and a "Discipline" field 704. The information may have been requested so that the page 701 is returned with the information in the presentation form 702 provided. The active page that corresponds to the URL should have a reference to the presentation. The presentation is designed with database fields on it that the designer wishes to be accessed. The presentation may be used in several places and in more than one page. The presentations are then used as building blocks and re-used as appropriate to access desired database fields. This information in the prior art required CGI code for this reference. The present invention only requires a graphical reference.

Referring again to FIG. 6, the page object can emit itself in one of two ways. It can emit itself as HTML, having the form of a typical web page. The page object can also emit itself as an applet tag. The applet tag points to the actual code that represents the presentation.

When there is an applet tag, the page object then creates the presentation. The presentation has in its description a data set that is to be accessed from a data source. The page creates a presentation at step 607. The presentation creates a download object at step 608. The download object is given a temporary URL. On the server, the presentation emits an applet tag to the page, included in which is a URL pointing to the class of the presentation and the download URL. The operation of the invention proceeds in parallel paths in this embodiment.

In a first path, the download object generates, for example SQL and begins to perform a query at step 609. (Although an SQL is given as an example, the download object could generate any suitable access to a data source). The data is being retrieved by the server at substantially the same time that the browser is receiving the page with the URL tag to the data. At step 610, the download object receives data returned from the query.

In the second path, the Browser sees the applet tag at step 611 and requests the class file of the applet. This request goes to the server which returns the class file generated by the presentation when it generated its applet tag. That class file is the class file that is created by a developer for data source access. The applet is retrieved by the browser at step 612 and the applet sees the download URL. At step 613 the applet makes a request for the download URL (the temporary URL). The download object responds with data at the application server. The applet receives the download URL and displays the data at step 614. The download URL can also be used for updating the data on the server as necessary. After the applet has received the data and displayed it, the user can change the data and when the user is ready to save, the download URL is used to return the data to the server for updating the data source.

Writing presentations is easier than writing CGI scripts. In many cases, no code writing is required. In simple cases, such as straightforward database queries and updates, the presentation can be built by drag and drop object oriented programming, without the need for new code. Some programming may be incorporated into the form, to make sure that fields are completed and completed with appropriate data types. The forms can be reused in a variety of applications without new coding. A hierarchy of forms can be created that can be linked together, making updating and new form creation easier than when CGI scripts are required.

It should be noted that a single page can include references to multiple presentations. A p age can have multiple data sets and multiple downloads, and multiple download URLs on the same page.

The following is an example of the emitted HTML for a page containing the presentation (tag.txt):

```
<HTML><HEAD></HEAD><BODY>
<P>
<applet code="Presentation.class"
    width=285
    height=230>
    <param name="DownloadURL"
        value="http:/ /localhost/Downloads/2">
</applet>
</BODY></HTML>
```

The invention provides improved performance over prior art data access schemes. The invention provides all of the advantages of a direct client server connection to a data source, as well as the advantages of three tier architecture systems.

Embodiment of Computer Execution Environment (Hardware)

Figure 1:
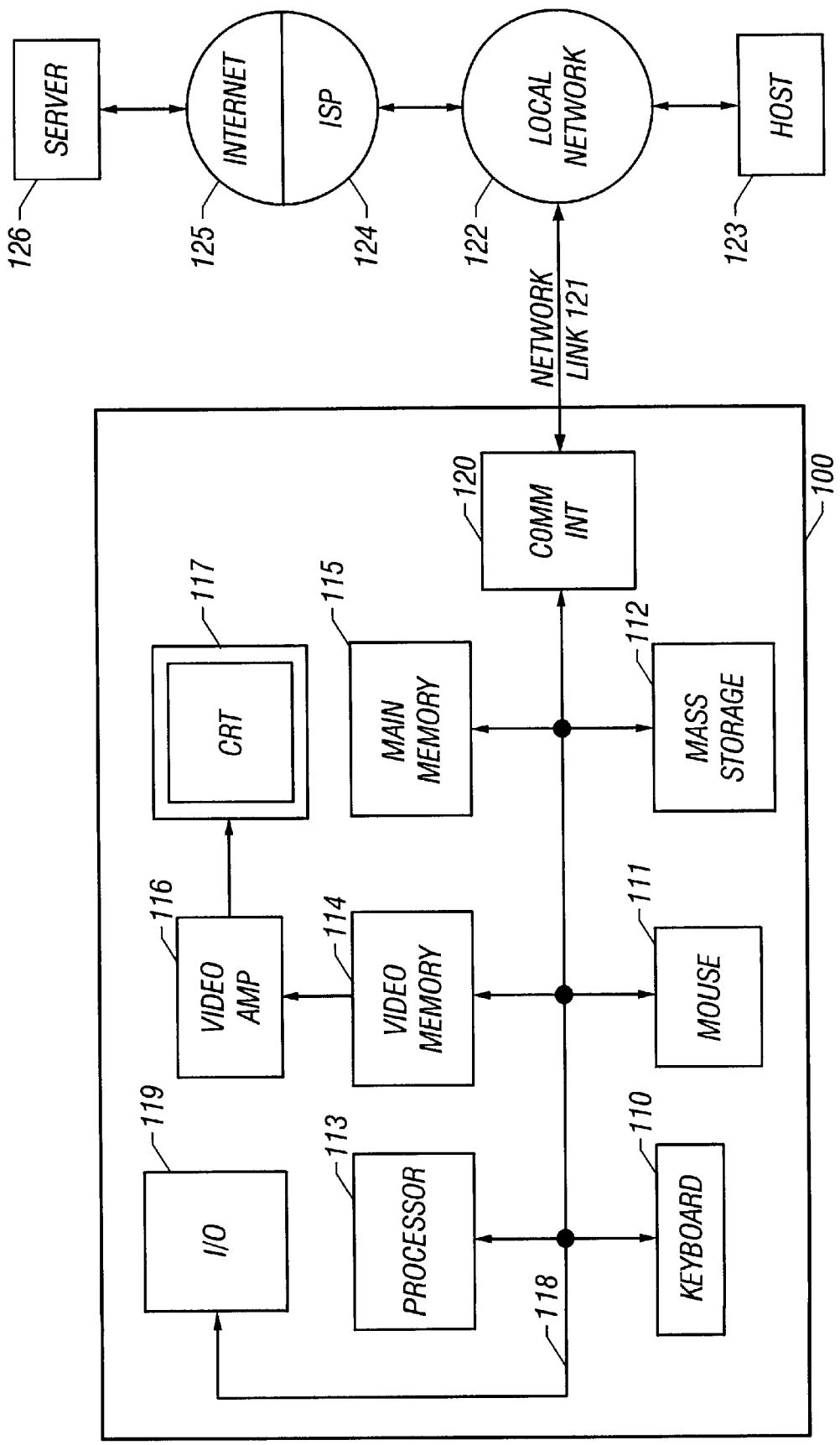
FIG. 1 illustrates an example computer system for implementing the present invention.
Figure 2:
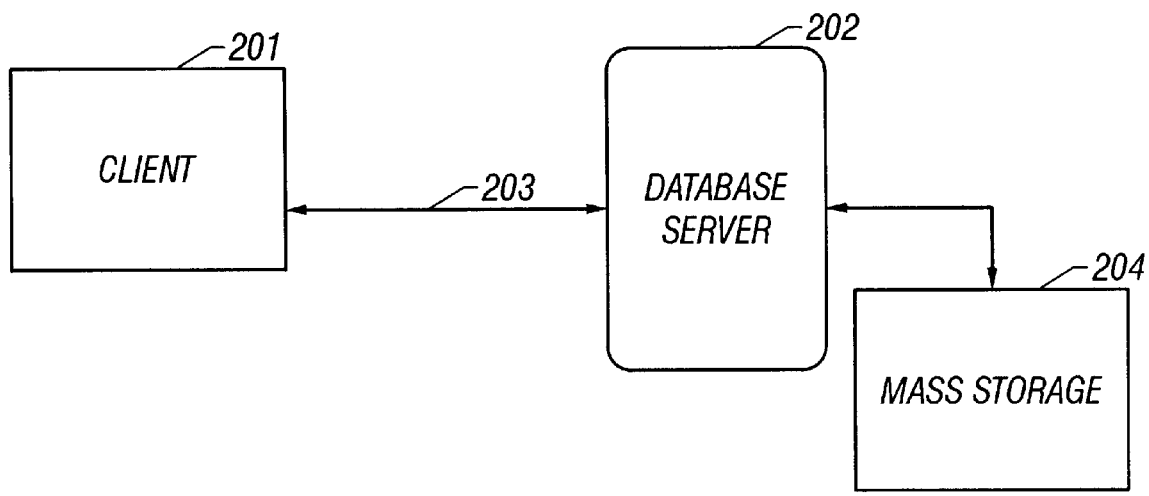
FIG. 2 is a block diagram of a prior art client server architecture.
Figure 3:
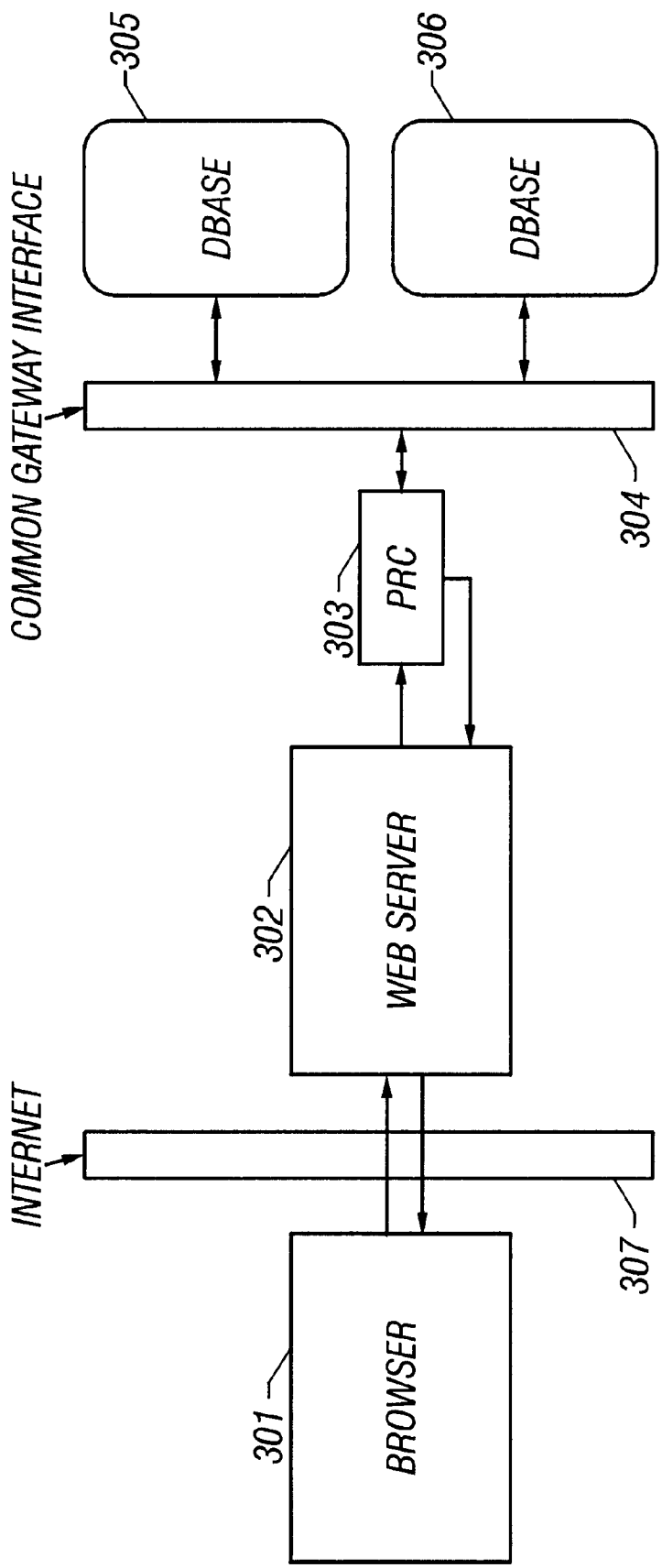
FIG. 3 is a block diagram of a prior art three tier approach to database access using an internet model.
Figure 4:
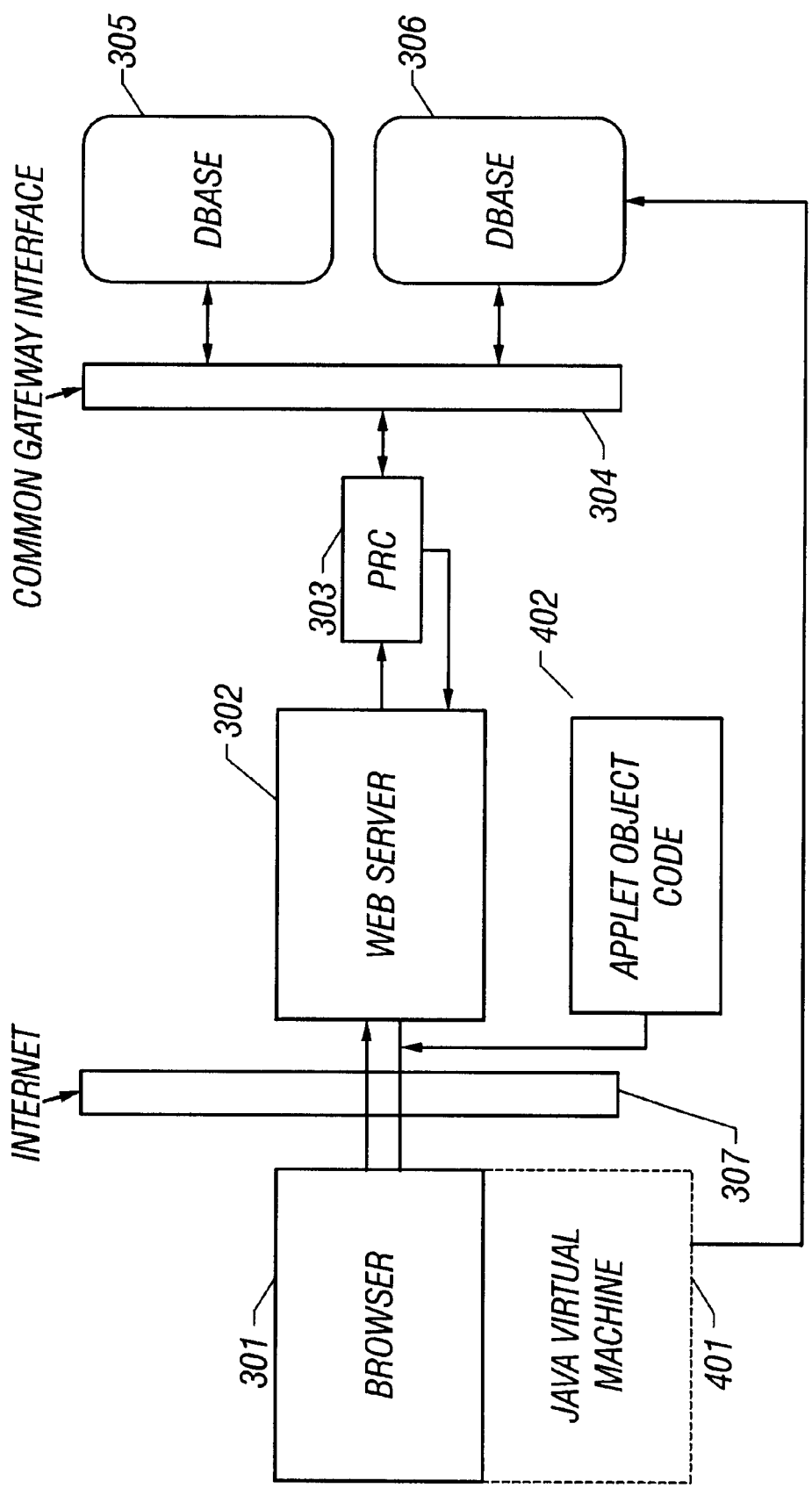
FIG. 4 is a block diagram of an applet based prior art approach to database access using an internet model.

An embodiment of the invention can be implemented as computer software in the form of computer readable code executed on a general purpose computer such as computer 100 illustrated in FIG. 1, or in the form of bytecode class files executable within a Java™ runtime environment running on such a computer. A keyboard 110 and mouse 111 are coupled to a bidirectional system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to bidirectional system bus 118 represents such I/O elements as a printer, A/V (audio/video) I/O, etc.

Computer 100 includes a video memory 114, main memory 115 and mass storage 112, all coupled to bidirectional system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Motorola, such as the 680X0 processor or a microprocessor manufactured by Intel, such as the 80X86, or Pentium processor, or a SPARC™ microprocessor from Sun Microsystems™, Inc. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for data source access in a three tier environment has been described.

What is claimed is:

1. A method for providing access to a data source from a browser comprising the steps of:
   sending a request for a page from a browser to a server having a page server portion and a data server portion;
   said page server retrieving said page, wherein said page is type encoded to signify additional processing may be required, said page comprising a reference to a presentation;
   creating said presentation in said page wherein said presentation is coupled to said data server portion of said server;
   said page server portion providing a non-data bearing portion of said page to said browser;
   said data server portion retrieving appropriate data from said data source using said presentation; and
   said data server portion providing said appropriate data from said data source to a data bearing portion of said page for display at said browser.

2. The method of claim 1 wherein said step of retrieving appropriate data form said data source is accomplished by the steps of:
   said presentation creating a download object;
   said download object generating a data request;
   initiating said data request to said data source;
   retrieving said appropriate data from said data source.

3. The method of claim 2 wherein said page when transmitted to said browser includes a reference to said download object that initiates retrieval of said appropriate data from said download object.

4. The method of claim 3 wherein said step of retrieval of said appropriate data from said download object comprises the steps of:
   retrieving an executable file from said server;
   executing said executable file on said browser;
   said executable file requesting said appropriate data from said download object using said reference;
   said executable file receiving said appropriate data from said download object.

5. The method of claim 4 wherein said presentation comprises executable code.

6. The method of claim 5 wherein said reference to said appropriate data comprises a universal resource locator (URL).

7. The method of claim 6 wherein said executable file comprises a browser independent executable file.

8. The method of claim 7 wherein said browser independent executable file comprises a Java™ browser independent executable file.

9. A computer program product comprising:
   a computer usable medium having computer readable program code embodied therein configured to provide access to a data source from a browser, said computer program product comprising:
   computer readable program code configured to cause a computer to send a request for a page from a browser to a server having a page server portion and a data server portion;
   computer readable program code configured to cause a computer to retrieve said page via the page server portion, said page being encoded to signify additional processing may be required, said page comprising a reference to a presentation;
   computer readable program code configured to cause a computer to create said presentation in said page wherein said presentation is coupled to said data server portion of said server;
   computer readable program code configured to cause said page server portion to provide a non-data bearing portion of said page to said browser;
   computer readable program code configured to cause said data server portion to retrieve appropriate data from said data source using said presentation;
   computer readable program code configured to cause said data server portion to provide said appropriate data from said data source to a data bearing portion of said page for display at said browser.

10. The computer program product of claim 9 wherein retrieving appropriate data from said data source is accomplished by:
    computer readable program code configured to cause a computer to create a download object using said presentation;
    computer readable program code configured to cause a computer to generate a data request using said download object;
    computer readable program code configured to cause a computer to initiate said data request to said data source;
    computer readable program code configured to cause a computer to retrieve said appropriate data from said data source.

11. The computer program product of claim 10 wherein said page when transmitted to said browser includes a reference to said download object that initiates retrieval of said appropriate data from said download object.

12. The computer program product of claim 11 wherein said retrieval of said appropriate data from said download object comprises:
    computer readable program code configured to cause a computer to retrieve an executable file from said server;
    computer readable program code configured to cause a computer to execute said executable file on said browser;
    computer readable program code configured to cause said executable file to request said appropriate data from said download object using said reference;
    computer readable program code configured to cause said executable file to receive said appropriate data from said download object.

13. The computer program product of claim 12 wherein said presentation comprises executable code.

14. The computer program product of claim 13 wherein said reference to said appropriate data comprises a universal resource locator (URL).

15. The computer program product of claim 14 wherein said executable file comprises a browser independent executable file.

16. The computer program product of claim 15 wherein said browser independent executable file comprises a Java™ browser independent executable file.

17. The method of claim 1 wherein said additional processing comprises encapsulating an applet in the processing of said page.

18. The computer program product of claim 9 wherein said additional processing comprises encapsulating an applet in the processing of said page.

19. An apparatus for providing access to a data source from a browser comprising:

a client comprising a browser and a virtual machine;

an application server having a page server portion and a data server portion, said browser coupled to said page server portion over a communication network;

a plurality of data sources coupled to said data server portion, access to said plurality of data sources from said browser comprising:

said browser sending a request to said application server for a page containing data from said plurality of data sources;

said page server retrieving said page, wherein said page is type encoded to signify additional processing, said page comprising a reference to a presentation;

said page creating said presentation in said browser using said virtual machine, said presentation being coupled to said data server portion of said application server;

said page server portion providing the non-data bearing portion of said page to said browser;

said data server portion retrieving appropriate data from said plurality of data sources using said presentation; and said data server portion providing said appropriate data from said plurality of data sources to the data bearing portion of said page for display at said browser.

20. The apparatus of claim 19 wherein said retrieving appropriate data from said plurality of data sources comprises:

said presentation creating a download object;

said download object generating a request for data;

said download object sending said request to said plurality of data sources;

said download object receiving said data from said plurality of data sources.

* * * * *